(12) United States Patent
Lin et al.

(10) Patent No.: US 12,739,660 B2
(45) Date of Patent: Sep. 15, 2026

(54) SIGNAL FORWARDING METHOD AND RELATED APPARATUS

(71) Applicant: Morelink Technology Corporation, Taipei City (TW)

(72) Inventors: Chunn-yenn Lin, Taipei City (TW); Yung-ting Lee, Taipei City (TW)

(73) Assignee: Morelink Technology Corporation, Taipei City (TW)

( * ) Notice: Subject to any disclaimer, the term of this patent is extended or adjusted under 35 U.S.C. 154(b) by 286 days.

(21) Appl. No.: 18/383,062

(22) Filed: Oct. 24, 2023

(65) Prior Publication Data

US 2024/0137778 A1 Apr. 25, 2024
US 2024/0236701 A9 Jul. 11, 2024

Related U.S. Application Data

(60) Provisional application No. 63/418,970, filed on Oct. 24, 2022.

(51) Int. Cl.

*H04W 16/26* (2009.01)
*H04B 7/155* (2006.01)
*H04W 52/52* (2009.01)

(52) U.S. Cl.

CPC ........ *H04W 16/26* (2013.01); *H04B 7/15578* (2013.01); *H04W 52/52* (2013.01)

(58) Field of Classification Search

CPC ..... H04W 16/26; H04W 52/52; H04W 52/46; H04B 7/15578; H04B 7/15535

See application file for complete search history.

(56) References Cited

U.S. PATENT DOCUMENTS

| | | | | |
|---|---|---|---|---|
| 7,406,295 B1 * | 7/2008 | Yarkosky | H04B 7/15507 | 455/562.1 |
| 11,658,732 B2 * | 5/2023 | Luo | H04B 7/15535 | 455/9 |
| 2009/0196215 A1 * | 8/2009 | Sabat | H04B 7/15535 | 370/315 |
| 2010/0150034 A1 * | 6/2010 | Song | H04B 7/2606 | 370/279 |
| 2012/0015603 A1 * | 1/2012 | Proctor, Jr. | H01Q 21/28 | 455/11.1 |
| 2013/0143483 A1 * | 6/2013 | Gore | H04B 7/15585 | 455/7 |
| 2021/0306962 A1 * | 9/2021 | Abedini | H04W 52/242 | |
| 2022/0369121 A1 * | 11/2022 | Islam | H04W 16/28 | |

* cited by examiner

*Primary Examiner* — Brandon J Miller

(57) ABSTRACT

Provided is a signal forwarding method and related apparatus. In the method, a repeater determines which part of received signals, which are the cellular communication signals, are to be forwarded, according to a control of the network, and then utilizes a gain of the repeater to amplify the determined signals and forwarding the amplified signals. With this method, the effective power spectrum density transmitted by the repeater becomes larger. Multipath or multi-user interference may also be minimized.

16 Claims, 5 Drawing Sheets

100

110 determining which part of received signals, which are the cellular communication signals, are to be forwarded, according to a control of the network 120 utilizing a gain of the repeater to amplify the determined signals and forwarding the amplified signals ●Case1：without repeater gain setting ●Case2：with repeater gain setting

SIGNAL FORWARDING METHOD AND RELATED APPARATUS

CROSS REFERENCE TO RELATED APPLICATION

This application claims the benefit of priority under 35 USC § 119(e) of U.S. Provisional Application No. 63/418,970, filed Oct. 24, 2022, the contents of which are incorporated by reference as if fully set forth herein in their entirety.

TECHNICAL FIELD

The present application relates to wireless communication technologies, and more particularly to a signal forwarding method and related apparatus.

BACKGROUND

In wireless communication systems, signals are exchanged between a base station (e.g., a cell tower, or gNB in 5G NR (New Radio)) and one or more mobile terminals or user equipments (UEs). The base station can provide services within a coverage area, which may be expanded by a use of repeaters. The repeaters can improve the quality of wireless communication by receiving, filtering, amplifying and re-transmitting the signals communicated between the base station and the one or more UEs in both an uplink direction (i.e., from the UE to the base station) and a downlink direction (i.e., from the base station to the UE).

With the development of modern wireless communication technology, the bandwidth resources used for communication among base stations and their serving devices are allocated in a combination of frequency domain, time domain and even spatial domain. A clear example is the orthogonal frequency-division multiple access (OFDMA) technology that has been widely used in Wi-Fi, LTE, and 5G NR. However, since conventional repeaters directly forward the signals received either from the base station or its serving devices, the repeaters may not have a great performance on transmitted power spectrum density.

Furthermore, with conventional repeaters, the repeating signal can only be passed through the frequency filters. That is, the conventional repeater will introduce additional multipath interference to the devices in its service area when the devices can directly receive the signals from the base station at the same time. In addition, conventional repeater gain control is based on the received signal strength and the maximum output power. In other words, gain control is achieved through Rx Gain Control (RGC) and Tx power Level Control (TLC) of the conventional repeater itself. As a result, the base station does not have any information or method to instruct the device to reduce its transmit power, especially when the device is close to the repeater. In this scenario, multipath or multi-user interference is inevitable, power consumption of the device cannot be efficiently reduced, and the repeater may waste its power to repeat the signal of the device that can be served well by the base station.

SUMMARY

In an aspect, the present application provides a signal forwarding method, applied to a first device, in which the first device is used to amplify cellular communication signals between a second device and a plurality of third devices in a network, the method including: determining which part of received signals, which are the cellular communication signals, are to be forwarded, according to a control of the network; and utilizing a gain of the first device to amplify the determined signals and forwarding the amplified signals.

In another aspect, the present application provides a first device, used to amplify cellular communication signals between a second device and a plurality of third devices in a network, the first device including: a Rx circuit; a Tx circuit; and a controller, coupled to the Rx circuit and the Tx circuit, the controller being configured to: determine which part of received signals, which are the cellular communication signals, are to be forwarded, according to a control of the network; and utilize a gain of the first device to amplify the determined signals and forwarding the amplified signals.

In still another aspect, the present applicant provides a non-transitory machine-readable medium, including a plurality of instructions, when executed by a machine, the instructions cause the machine to perform the afore-described method.

In embodiments of the present application, the repeater determines which part of received signals, which are the cellular communication signals, are to be forwarded, according to a control of the network, and then utilizes a gain of the repeater to amplify the determined signals and forwarding the amplified signals. With this method, the effective power spectrum density transmitted by the repeater becomes larger due to the selectivity, which means that the effective service area of the repeater can also be larger. Multipath or multi-user interference may also be minimized by this selective forwarding.

DETAILED DESCRIPTION

In this document, a combination such as "at least one of A, B, or C," "one or more of A, B, or C," "at least one of A, B, and C," "one or more of A, B, and C," or "A, B, and/or C" may be A only, B only, C only, A and B, A and C, B and C, or A and B and C, where any combination may contain one or more members of A, B, or C.

Figure 1:
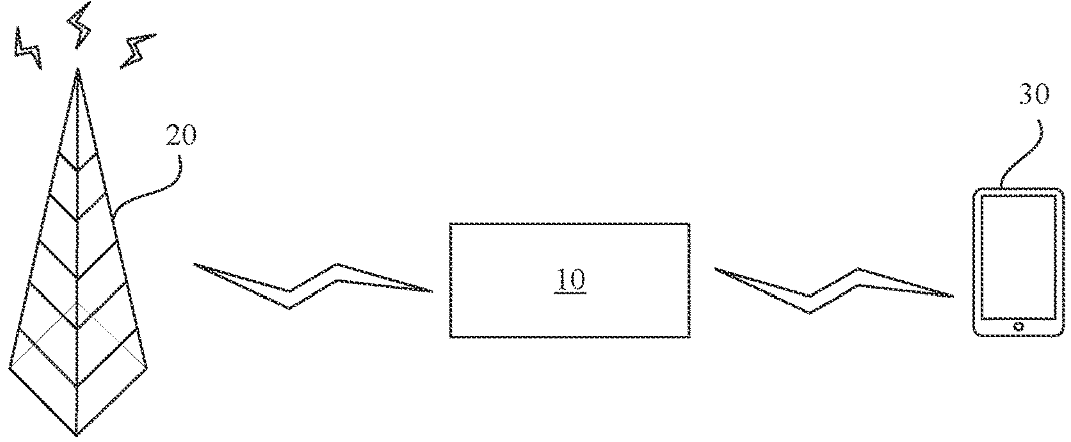
FIG. 1 illustrates a possible network architecture to which the present application is applicable.

FIG. 1 illustrates a possible network architecture to which the present application is applicable. As shown in FIG. 1, a first device 10 communicates with a second device 20 and a third device 30. The first device 10 is used to repeat or forward signals received either from the second device 20 or the third device 30. The first device can be a signal repeater or relay. The second device 20 is an entity used to transmit or receive signals on the network side, such as a base station in a wireless cellular network. The second device 20 can be, for example, an eNB (or eNodeB) in Long Term Evolution (LTE), or a gNB (or gNodeB) in New Radio (NR), or any network device in future mobile network. The third device 30 is a terminal device, which can exchange information and/or data with the wireless cellular network such as a Radio Access Network (RAN). The third device 30 would be implemented by a wireless terminal, a user terminal, a user equipment (UE), a mobile terminal (MT), and etc.

In the following description, the first device 10, the second device 20 and the third device 30 are illustrated by a repeater, a base station and a user equipment, respectively, but the invention is not limited thereto.

As shown in FIG. 1, the repeater 10 is arranged between the base station 20 and the user equipment 30. The repeater 10 can improve the quality of wireless communication by receiving, filtering, amplifying and re-transmitting the signals (more specifically, cellular communication signals) communicated between the base station 20 and the user equipment 30 in both an uplink direction (i.e., from the UE 30 to the base station 20) and a downlink direction (i.e., from the base station 20 to the UE 30). Although illustrated by only one user equipment and only one base station, the repeater 20 may serve more than one user equipments and may repeat signals from more than one base stations and transmit repeated signals to more than one base stations. The repeater 20 may be arranged at a fixed location, such as in a room of a building, or be mounted to a movable object, such as a vehicle.

Figure 2:
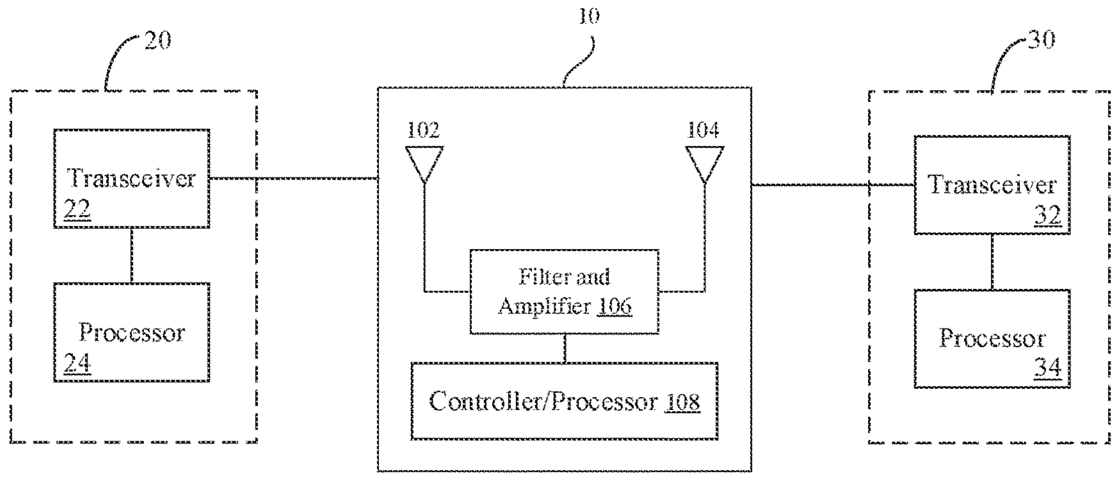
FIG. 2 is a block diagram illustrating a communication system according to some embodiments of the present application.

FIG. 2 is a block diagram illustrating a communication system according to some embodiments of the present application. The communication system includes the aforementioned repeater 10, base station 20 and user equipment 30, which can execute embodiments of the method according to the present application. Connections between devices and device components are shown as connecting lines in FIG. 2. The base station 20 includes a transceiver 22 and a processor 24, which are electrically connected with each other. The user equipment 30 includes a transceiver 32 and a processor 34, which are electrically connected with each other. The repeater 10 includes a transceiver 102 and 104, a controller/processor 108, and a filter and amplifier 106 coupled between the transceiver 102 and 104 and the controller/processor 108. The transceiver 32 of the user equipment 30 is configured to transmit a signal, which is repeated by the repeater 10 using the transceiver 102 and 104 and is then forwarded to the base station 20 (and receive a repeated signal transmitted from the transceiver 102 and 104 of the repeater 10, which may be from the base station 20) and the processor 24 of the base station 20 processes the signal, and the transceiver 22 of the base station 20 is configured to transmit a signal, which is repeated by the repeater 10 using the transceiver 102 and 104 and is then forwarded to the user equipment 30 (and receive a repeated signal transmitted from the transceiver 102 and 104 of the repeater 10, which may be from the user equipment 30) and the processor 34 of the user equipment 30 processes the signal. In this way, the user equipment 30 communicates with the base station 20 each other.

Each of the processors 24 and 34 and the controller/processor 108 may be configured to implement proposed functions, procedures and/or methods described in this description. Layers of radio interface protocols may be implemented in the processors 24 and 34 and/or the controller/processor 108. The repeater 10, the base station 20 and the user equipment 30 may each include a memory operatively storing a variety of program and information to operate a connected processor. Each of the transceiver 22 and 32 and the transceiver 102 and 104 is operatively coupled with a connected processor, transmits and/or receives radio signals.

Each of the processors 24 and 34 and the controller/processor 108 may include a general-purpose central processing unit (CPU), an application-specific integrated circuits (ASICs), other chipsets, logic circuits and/or data processing devices. The memory may include a read-only memory (ROM), a random access memory (RAM), a flash memory, a memory card, a storage medium, other storage devices, and/or any combination of the memory and storage devices. Each of the transceiver 22 and 32 and the transceiver 102 and 104 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The transceiver 102 and 104 of the repeater 10 may include a donor antenna 102 and a service antenna 104. The donor antenna 102 may be mounted externally or internally at a suitable location for receiving downlink signals from the base station 20. The downlink signals are provided to the filter and amplifier 106 to be filtered and amplified based on gain control, and the resulting signals are then provided to the service antenna 104, which can wirelessly communicate the resulting signals to the user equipment 30. In this way, the user equipment 30 can receive stronger signals from the base station 20.

The service antenna 104 may receive uplink signals from the user equipment 30. The uplink signals are provided to the filter and amplifier 106 to be filtered and amplified based on gain control, and the resulting signals are then provided to the donor antenna 102, which can wirelessly communicate the resulting signals to the base station 20. In this way, the base station 20 can receive the signals from the user equipment 30 that may be located outside of the coverage area of the base station 20.

Figure 3:
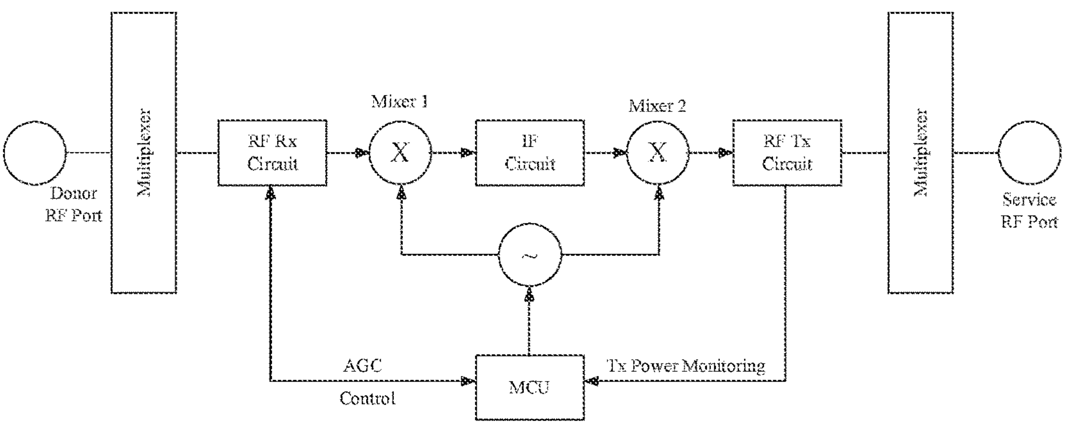
FIG. 3 is a block diagram illustrating an analog FDD repeater according to some embodiments of the present application.
Figure 4:
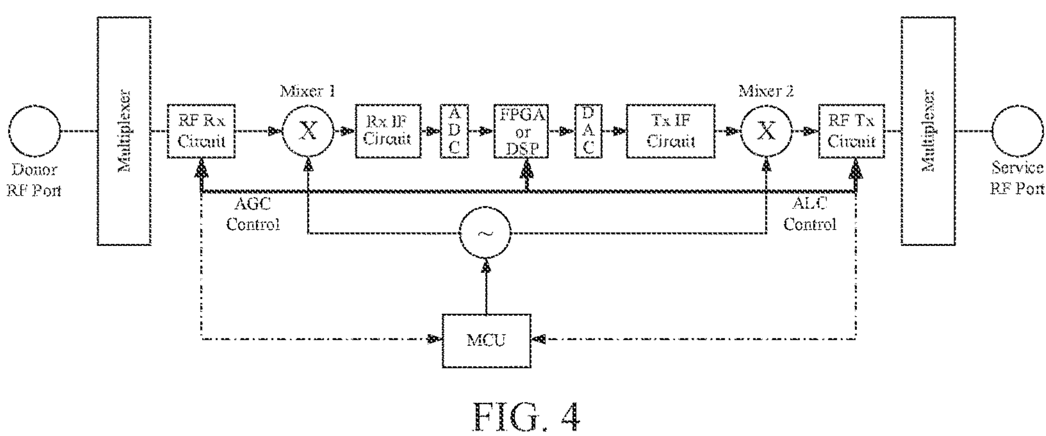
FIG. 4 is a block diagram illustrating a digital FDD repeater according to some embodiments of the present application.

FIG. 3 illustrates an analog frequency division duplex (FDD) repeater, while FIG. 4 illustrates a digital FDD repeater. The invention can be implemented not only by the analog FDD repeater and the digital FDD repeater illustrated in FIG. 3 and FIG. 4 respectively, but also by other types of repeaters, such as an analog time division duplex (TDD) repeater, a digital TDD repeater, or a hybrid repeater with mixed analog and digital circuits. It should be noted that the repeaters shown in FIG. 3 and FIG. 4 are illustrated exemplarily in a DL configuration; however, it is straightforward to derive a UL configuration for the repeaters. As a result, the UL configuration is omitted for simplicity of description.

As shown in FIG. 3 and FIG. 4, the repeater includes a radio frequency (RF) Rx circuit, an RF Tx circuit and a microcontroller (MCU), which may correspond to the controller/processor 108 depicted in FIG. 2. In one circuit configuration, for DL signals, the RF Rx circuit may be coupled to a donor RF port (via a multiplexer) which is used to connect to a donor antenna for receiving downlink signals from the base station, and the RF Tx circuit may be coupled to a service RF port (via a multiplexer) which is used to connect to a service antenna for transmitting the downlink signals to the user equipment. In another circuit configuration, for UL signals, the RF Rx circuit may be coupled to the service antenna for receiving uplink signals from the user equipment, and the RF Tx circuit may be coupled to the donor antenna for transmitting the uplink signals to the base station. The MCU coupled to the RF Rx circuit and the RF Tx circuit is configured to control Rx Gain of the RF Rx circuit and Tx Gain of the RF Tx circuit. The total gain of the repeater is considered as a sum of Rx Gain and Tx Gain. The control of Rx Gain is achieved by AGC (Auto Gain Control), while the control of Tx Gain is by ALC (Auto Level Control). For the analog repeater depicted in FIG. 3, the Tx Gain is usually fixed and thus, the control of the total gain of the analog repeater is mainly achieved by controlling the Rx Gain by AGC. For the digital repeater depicted in FIG. 4, both the Rx Gain and the Tx gain are configurable, and thus the control of the total gain of the digital repeater is achieved by controlling the Rx Gain by AGC and controlling the Tx Gain by ALC. Synchronization of the two control loops is necessary for the digital repeater.

As depicted in FIG. 3, the analog repeater includes an intermediate frequency (IF) circuit used to generate IF signals, and two mixers (i.e., Mixer 1 and Mixer 2) for frequency mixing with carrier frequency, for example. Different from the analog repeater depicted in FIG. 3, instead of the IF circuit arranged between the two mixers, the digital repeater depicted in FIG. 4 includes a Rx IF circuit, an analog-to-digital circuit (ADC), a field programmable gate array (FPGA) or digital signal processor (DSP) chip, a digital-to-analog circuit (DAC) and a Tx IF circuit located between the two mixers. The digital repeater performs digital signal processing by using the aforementioned circuit elements.

Conventional repeaters may not have a great performance on transmitted power spectrum density because they directly forward the signals received either from the base station or its serving devices. It is proposed in this application a smart repeater scheme that can select the repeating signal or selectively forward the received signals according to the controls of the network. The selectivity includes not only a repeater gain control combined with existing power control schemes in the base station, but also partially forwarding the received signals in the frequency domain, time domain, spatial domain, or a combination thereof. In this way, the effective power spectrum density transmitted by the smart repeater becomes larger due to the selectivity. Multipath or multi-user interference may also be minimized by this selective forwarding.

Figure 5:
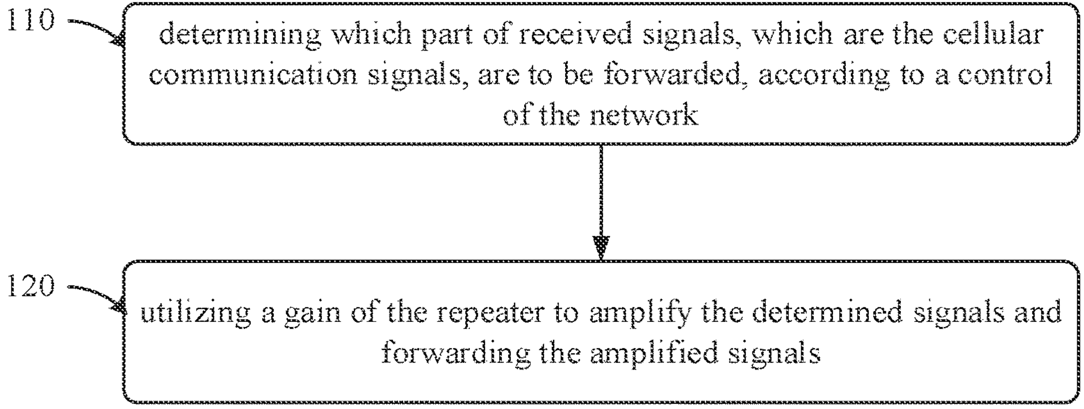
FIG. 5 is a flowchart of a signal forwarding method 100 according to some embodiments of the present application.

FIG. 5 is a flowchart of a signal forwarding method 100 according to some embodiments of the present application. The signal forwarding method 100 is applied to a first device, in which the first device is used to amplify cellular communication signals between a second device and a plurality of third devices in a network. The first device, the second device and the plurality of third devices may be a repeater, a base station (e.g., gNB) and user equipments, respectively, but the invention is not limited thereto. The exemplary structure of the repeater may be referred to FIGS. 2 to 4. The signal forwarding method 100 may be implemented in the MCU depicted in FIGS. 3 and 4 or any additional processing unit in the repeater. The method 100 includes the following steps.

Step 110: determining which part of received signals, which are the cellular communication signals, are to be forwarded, according to a control of the network.

In this step, the repeater receives either downlink signals from the base station or uplink signals from one or more user equipments. These signals are cellular communication signals. The repeater will determine which part of the received signals are to be forwarded or repeated according to the control of the network. That is, the repeater selectively forwards the received signals based on an instruction or indication of the network. The repeating signals are selected by the repeater and then forwarded to the base station (for uplink signals) or one or more user equipments (for downlink signals). The selective repeating signal is a useful signal obtained from the received signal, which will be amplified by the repeater with a specific gain and sent out.

In some embodiments, the received signals are forwarded in at least one of a partial frequency domain, a partial time domain and a partial spatial domain. That is, the repeater can partially forward the received signals in the frequency domain, time domain, spatial domain, or a combination thereof.

The selectivity may be based on symbols, such as orthogonal frequency-division multiplexing (OFDM) symbols, and controlled by the network. When a repeater is required for selective repeating, the following Steps 111 and 112 may be performed:

Step 111: obtaining required information of repeating signal selectivity transmitted from the network.

The repeater may need to get the information required for the repeating signal selectivity from the network. In an illustrated example, the required information may include applied frame information and selectivity information. The applied frame information indicates the frame(s) that will be applied the repeating signal selectivity control. The selectivity information provides more detailed control information for the selective forwarding.

The applied frame information may include:

a. The frame number of a frame m that carries the selectivity information.

b. The frame number of a frame n that will be applied to the selectivity control, where $n-m\geq 0$, depending on the capabilities of the smart repeater. That is, the frame n and the frame m may be the same frame, or the frame n is a subsequent frame with respect to the frame m.

The selectivity information may include:

a. Symbol duration of a frame that will be applied to the selectivity control.

b. The symbol number and associated symbol selectivity controls, including but not limited to gain, frequency domain selectivity, and spatial domain selectivity. The symbol number may be a start symbol number. With the symbol duration and the start symbol number, which symbol(s) will be applied the selectivity control can be known. With the associated symbol selectivity controls, corresponding controls can be performed on the indicated symbols.

It should be noted that for frequency domain, the selectivity information may include resource block(s) to be forwarded, and for spatial domain, the selectivity information may include a beam applied with beamforming to be forward.

Step 112: determining which part of the received signals are to be forwarded, based on the obtained required information.

With the information required for the repeating signal selectivity from the network, the repeater can determine which part of the received signals are to be forwarded. For example, based on the applied frame information and the selectivity information mentioned above, the repeater knows which received symbol(s) will be applied to the selectivity control.

Before Step 111, it may be needed to detect the frame start timing of the received signal in order to appreciate the frame information well. This can be achieved by detecting the synchronization signals sent by the base station.

Based on above description, Step 111 may further include the following step:

Step 1110: obtaining a frame number that carries selectivity information and a frame number that will be applied selectivity control, wherein the selectivity information includes symbol duration, symbol number and associated symbol selectivity controls.

Step 120: utilizing a gain of the repeater to amplify the determined signals and forwarding the amplified signals.

In this step, for the received signals determined to be forwarded in Step 110, the repeater amplifies these signals with a repeater gain and forwards the amplified signals to either the base station or one or more user equipments. Conversely, the repeater may not forward the received signals not determined to be forwarded.

In some embodiments, part of signals corresponding to a single user equipment may not be forwarded by the repeater. In some embodiments, the signals corresponding to a certain user equipment or some user equipments may not be forwarded by the repeater.

In some embodiments, in the determining step, the signals corresponding to the user equipment that is directly served by the repeater are determined to be forwarded, and the signals corresponding to the user equipment that is not directly served by the repeater are removed. That is, if the user equipment is not directly served by the repeater, the repeater may not forward corresponding signals. The repeater may only forward the signals the signals corresponding to the user equipment that is directly served by the repeater. This selective forwarding may at least save power consumption of the repeater and reduce possible interferences.

Figure 6:
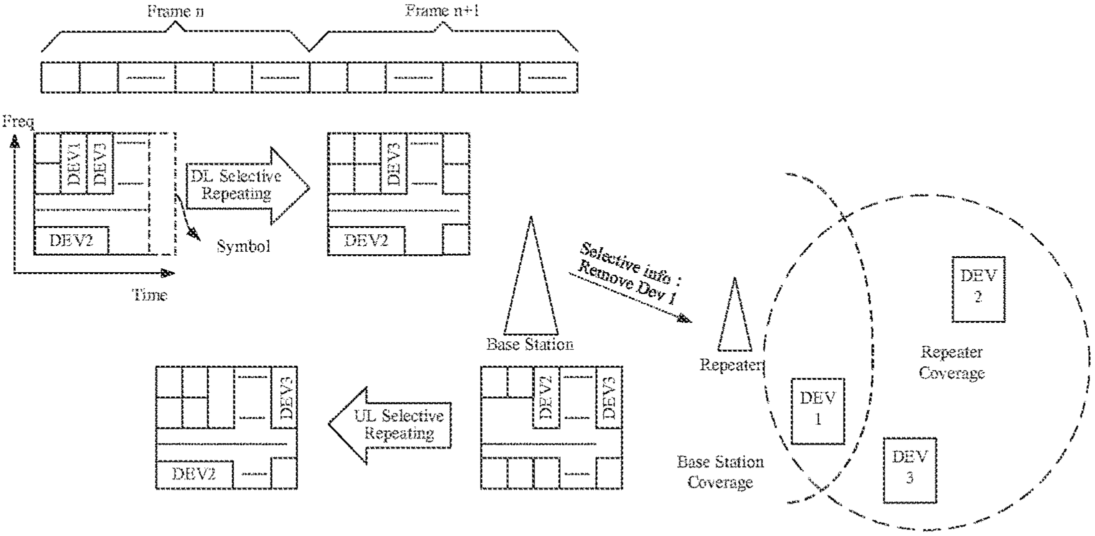
FIG. 6 is a schematic diagram depicting an example of the repeating signal selectivity according to some embodiments of the present application.

In some embodiments, the signals corresponding to the user equipment that is served by the base station are removed, and the signals corresponding to the user equipment not that is not served by the base station but is served by the repeater are determined to be forwarded. That is, if the user equipment can be served by both the base station and the repeater, the base station may instruct the repeater to remove the signals corresponding to the user equipment. This may reduce possible interferences. Referring to FIG. 6 for further details.

FIG. 6 depicts an example of the repeating signal selectivity. In this example, DEV1 can directly communicate with the base station. For a conventional repeater, it forwards the DL signal received from the base station to DEV1. Since DEV1 can also directly receive the signal from the base station, the forwarded DL signal will cause DL multipath interference to DEV1. Likewise, the UL signal forwarded by the conventional repeater will also cause UL multipath interference to the base station. These multipath interferences can contaminate the quality of the received signal, further degrading throughput performance. However, for the repeater of this application, it may be required to remove the DL and UL data of DEV1 before forwarding as shown in FIG. 5. Therefore, the possible multipath interferences between the base station and DEV1 can be effectively eliminated.

For the selective repeating signals, they can be "as is" as received by the repeater or an equalized version of the received signals. Equalization is to compensate for channel effects from the transmitter (i.e., the base station for DL and the device for UL) to the repeater receiver. Therefore, the equalized signal can have better quality than the "as is" signal. The equalization is typically achieved by the repeater itself using reference signals (i.e., pilots) embedded in the transmitted signal. That is, an equalized version of the determined signals can be forwarded in the selectively forwarding step.

The present application provides the signal forwarding method as described above. In this signal forwarding method, the repeater determines which part of received signals, which are the cellular communication signals, are to be forwarded, according to a control of the network, and then utilizes a gain of the repeater to amplify the determined signals and forwarding the amplified signals. With this method, the effective power spectrum density transmitted by the repeater becomes larger due to the selectivity, which means that the effective service area of the repeater can also be larger. Multipath or multi-user interference may also be minimized by this selective forwarding.

Conventionally, gain control is achieved through Rx Gain Control (RGC) and Tx power Level Control (TLC) of the repeater itself. Conventional repeater gain control is based on the received signal strength and the maximum output power. The conventional repeater gain control is not designed to consider entire network conditions. The output power of the repeater may not be used in an efficient manner.

Furthermore, the base station does not have any information or method to instruct the device (or UE) to reduce its transmit power, especially when the device (or UE) is close to the repeater. As a result, multipath or multi-user interference is inevitable, and power consumption of the device (or UE) cannot be efficiently reduced.

In order to address above problems, a novel repeating gain control scheme is further proposed, in which the base station can control the repeater to provide different repeating gains for the devices (or UEs) served by the repeater.

Figure 7:
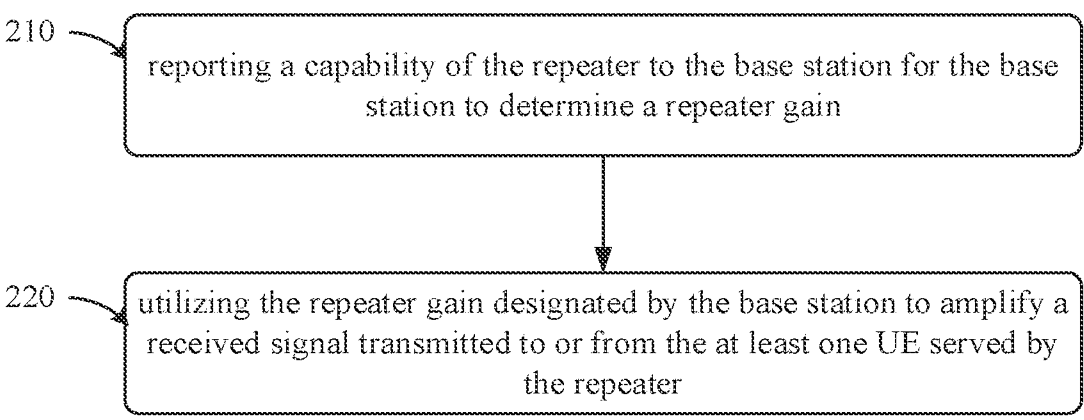
FIG. 7 is a flowchart of a wireless communication method by a first device according to some embodiments of the present application.

FIG. 7 is a flowchart of a wireless communication method 200 by a first device according to some embodiments of the present application. The wireless communication method 200 is applied to a first device, in which the first device is used to amplify cellular communication signals between a second device and at least one third device in a network. The first device, the second device and the at least one third device may be a repeater, a base station (e.g., gNB) and at least one user equipment (UE), respectively, but the invention is not limited thereto. The exemplary structure of the repeater may be referred to FIGS. 2 to 4. The wireless communication method 200 may be implemented in the MCU depicted in FIGS. 3 and 4 or any additional processing unit in the repeater. The method 200 includes the following steps.

Step 210: reporting a capability of the repeater to the base station for the base station to determine a repeater gain.

In this step, the repeater reports the capability of the repeater to the base station. The capability of the repeater may be power transmission capability or repeater gain capability of the repeater. The repeater gain may be a repeater gain based on resources such as time domain resources, frequency domain resources, and etc. For example, the repeater gain may be a resource block repeater gain (RBRG) for one or more resource blocks allocated to the at least one user equipment served by the repeater. That is, the repeater gain may be a resource or resource block-based repeater gain, but the invention is not limited thereto. The capability of the repeater may include at least one of the followings:

a. maximum Total Power Repeater Gain (TPRG)

b. maximum RBRG c. maximum total transmit power.

The repeater may negotiate the repeater gain (or RBRG for one or more resource blocks) for a particular user equipment with the base station based on the capability of the repeater and transmit power that has been used for other user equipments. Upon negotiating with the repeater and/or communicating with the user equipment served by the repeater, the base station may determine an appropriate repeater gain (or RBRG for one or more resource blocks) for the repeater to amplify a received signal that is transmitted to or from the at least one user equipment served by the repeater.

Step 220: utilizing the repeater gain designated by the base station to amplify a received signal transmitted to or from the at least one UE served by the repeater.

After the base station determines the repeater gain, the repeater will receive a designated repeater gain transmitted by the base station. The determined repeater gain by the base station may be the repeater gain designated to transmit to the repeater by the base station. Upon receiving the designated repeater gain, the repeater utilizes the designated repeater gain to amplify the received signal, which may be a downlink signal transmitted to the at least one user equipment served by the repeater or an uplink signal transmitted from the at least one user equipment served by the repeater.

That is to say, the base station can determine an appropriate repeater gain for the repeater to amply the signal received by the repeater, either in downlink direction or in uplink direction. The appropriate repeater gain can facilitate efficient power utilization of the repeater in downlink transmission and reduce transmit power of the at least one user equipment in uplink transmission.

More specifically, for downlink (DL) signals, as the user equipment moves away from the repeater, its resource blocks are amplified by higher gains. On the other hand, when a user equipment is close to the repeater, its resource blocks are amplified by smaller gains. It can be said that the weaker the signals of the user equipment, the greater the repeater gain (or the RBRG) is. Therefore, the output power of the repeater can be used in a more efficient manner.

More specifically, for uplink (UL) signals, the base station can instruct the user equipment served by the repeater to transmit its UL data at lower power through the open-loop and closed-loop power control schemes, which are well defined in the standard. Then, the base station requires the repeater to amplify the corresponding UL resource block with a higher gain to reduce the transmit power of the user equipment.

In some embodiments, the repeater may be operated at different repeater gains for resource blocks that are to be repeated. For example, the repeater may be designated with different repeater gains for the resource blocks allocated to a same user equipment. That is, each resource block or each set of resource blocks allocated to the same user equipment may be amplified by the repeater using a different repeater gain. For another example, the repeater may be designated with different repeater gains for the resource blocks allocated to different user equipments. That is, the resource blocks allocated to different user equipments may be amplified by the repeater using different repeater gains.

In some embodiments, the greater a distance between the repeater and the at least one user equipment is, the greater the repeater gain is utilized. For example, the base station may determine the distance between the repeater and the user equipment by estimating the pass loss between the repeater and the user equipment based on reference signal received strength (RSRP). It may be determined a large distance between the repeater and the user equipment when the pass loss is relatively large; it may be determined a small distance between the repeater and the user equipment when the pass loss is relatively small. As a result, a large repeater gain may be designated to the repeater in the case of large distance, and a small repeater gain may be designated to the repeater in the case of small distance. This is particularly applicable in downlink transmission.

In some embodiments, the base station can have the information of transmit powers of the user equipment served by the repeater, for example, from the closed-loop power control. After estimation or evaluation, the base station may determine to increase the repeater gain of the repeater so as to reduce the transmit power of the user equipment. Once the base station notifies the repeater to increase its repeater gain, the base station may require the at least one user equipment, which is a disconnected device, to transmit random access data by a designated received power at the second device through the open-loop power control, or may require the at least one user equipment, which is a connected device, to transmit uplink data by a designated transmit power through the closed-loop power control. Since the repeater gain is increased, the transmit power of the at least one user equipment can be reduced. The strength of the uplink signals received by the base station can remain unchanged.

Figure 8:
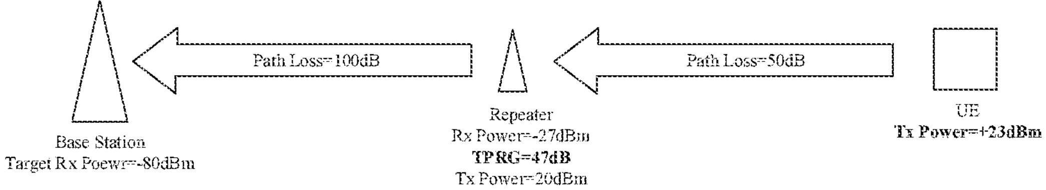
FIG. 8 is a schematic diagram illustrating an example of repeating gain setting and/or UE transmit power adjustment according to some embodiments of the present application.
Figure 8:
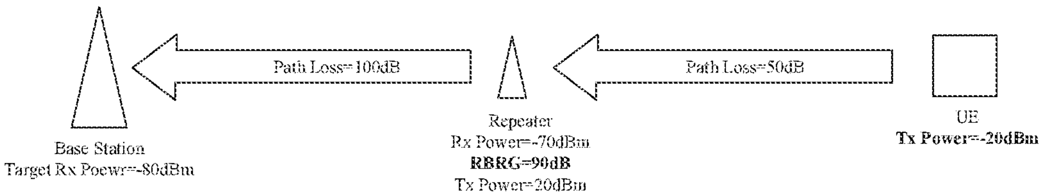

FIG. 8 is a schematic diagram illustrating an example of repeating gain setting according to some embodiments of the present application. Referring to FIG. 8, it is assumed that maximum total power repeater gain (TPRG) is 70 dB, maximum resource block repeater gain (RBRG) is 100 dB, and maximum total transmit power is 23 dBm for the repeater. In this scenario, the user equipment initially transmits at +23 dBm, and with path loss 50 dB between the user equipment and the repeater, the repeater receives at −27 dBm. The repeater amplifies the signals with a repeater gain 47 dB, and accordingly, the transmit power of the repeater is 20 dBm. With path loss 100 dB between the repeater and the base station, the base station receives at −80 dBm. With the repeater gain setting and/or UE transmit power adjustment involved according to this invention, the user equipment can transmit the signals at reduced transmit power, i.e., −20 dBm, while the repeater gain of the repeater is increased to 90 dB. It is obvious that the 43 dB power reduction is obtained from the resource block repeater gain (RBRG) setting of the repeater. Therefore, the transmit power of the user equipment served by the repeater can be effectively reduced. Note that although the maximum RBRG is 100 dB, the base station reserves 10 dB for the possible fading.

The present application provides the wireless communication method as described above. In this wireless communication method, the repeater reports a capability of the repeater to the base station for the base station to determine a repeater gain, and the repeater utilizes the repeater gain designated by the base station to amplify a received signal transmitted to or from the at least one user equipment served by the repeater. With this method, multipath or multi-user interference introduced by the repeater to the mobile network can be minimized. Furthermore, the output power of the repeater can be used in a more efficient manner, particularly for downlink transmission. In addition, the transmit power of the user equipment served by the repeater can be effectively reduced, particularly for uplink transmission, thereby realizing an efficient power saving, which is particularly important for battery-powered devices.

Figure 9A:
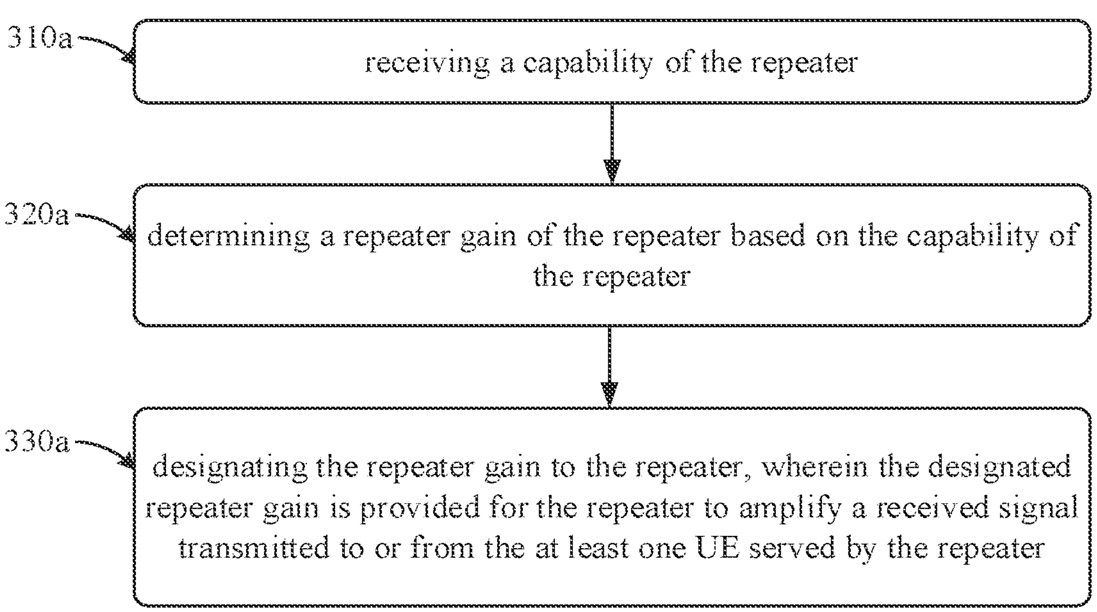
FIG. 9A is a flowchart of a wireless communication method by a second device according to some embodiments of the present application.

FIG. 9A is a flowchart of a wireless communication method 300A by a second device according to some embodiments of the present application. The wireless communication method 300A is applied to a second device communicating with at least one third device via a first device. The first device is used to amplify cellular communication signals between the second device and the at least one third device in a network. The first device, the second device and the at least one third device may be a repeater, a base station (e.g., gNB) and at least one user equipment (UE), respectively, but the invention is not limited thereto. The exemplary structure of the base station may be referred to FIG. 2. The wireless communication method 300A may be implemented in the processor 24 depicted in FIG. 2. The method 300A includes the following steps.

Step 310*a*: receiving a capability of the repeater.

Step 320*a*: determining a repeater gain of the repeater based on the capability of the repeater.

Step 330*a*: designating the repeater gain to the repeater, wherein the designated repeater gain is provided for the repeater to amplify a received signal transmitted to or from the at least one UE served by the repeater.

Further details on the wireless communication method 300A may be referred to the descriptions of each implementation of the wireless communication method 200 provided above, which are not repeated herein.

Figure 9B:
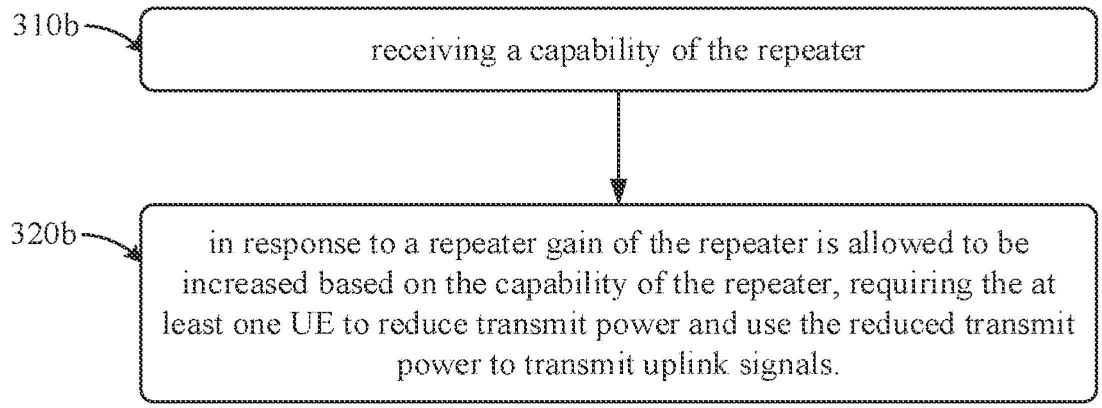
FIG. 9B is a flowchart of another wireless communication method by a second device according to some embodiments of the present application.

FIG. 9B is a flowchart of another wireless communication method 300B by a second device according to some embodiments of the present application. The wireless communication method 300B is applied to a second device, which can be a base station as described above, communicating with at least one UE via a repeater. The method 300B includes the following steps.

Step 310*b*: receiving a capability of the repeater.

Step 320*b*: in response to a repeater gain of the repeater is allowed to be increased based on the capability of the repeater, requiring the at least one UE to reduce transmit power and use the reduced transmit power to transmit uplink signals.

Further details on the wireless communication method 300B may be referred to the descriptions of each implementation of the wireless communication method 200 provided above, which are not repeated herein.

It should be noted that the selective forwarding scheme described in the aforementioned signal forwarding method may be incorporated into the wireless communication method. That is, the signal which is amplified by using the repeater gain designated by the base station may be the signal which is to be selectively forwarded. Conversely, the repeater gain setting described in the wireless communication method may be incorporated into the aforementioned signal forwarding method. It can be expected that these two methods can be combined at will without significant contradiction.

The afore-described selective repeating control and repeater gain setting may begin with a control decision process that lets the base station determine which repeater to be assigned to serve the device (or UE). After the assignment is completed, the base station generates the control information in time according to the timely measurement reports of itself, the device (or UE) and/or the repeater. The control information includes, but is not limited to:

The selective repeating control information, which instructs the target repeater what to selectively repeat in frequency domain, time domain, spatial domain, or any combination of the above three domains. Additionally, it also indicates the repeater gain associated with the selective forwarding data.

The forwarding time control information, which indicates when the target repeater SHALL perform the selective repeating.

The control channel information, which indicates where the target repeater obtains the required control information.

Control decision is primarily a process to determine which device's data should be selected from the received signal for forwarding. Unlike the conventional repeaters, repeaters of the present application can be recognized by the network. Therefore, the control decision process is to establish the network topology of base stations, repeaters, and devices. Details of the process are described as follows.

Figure 10:
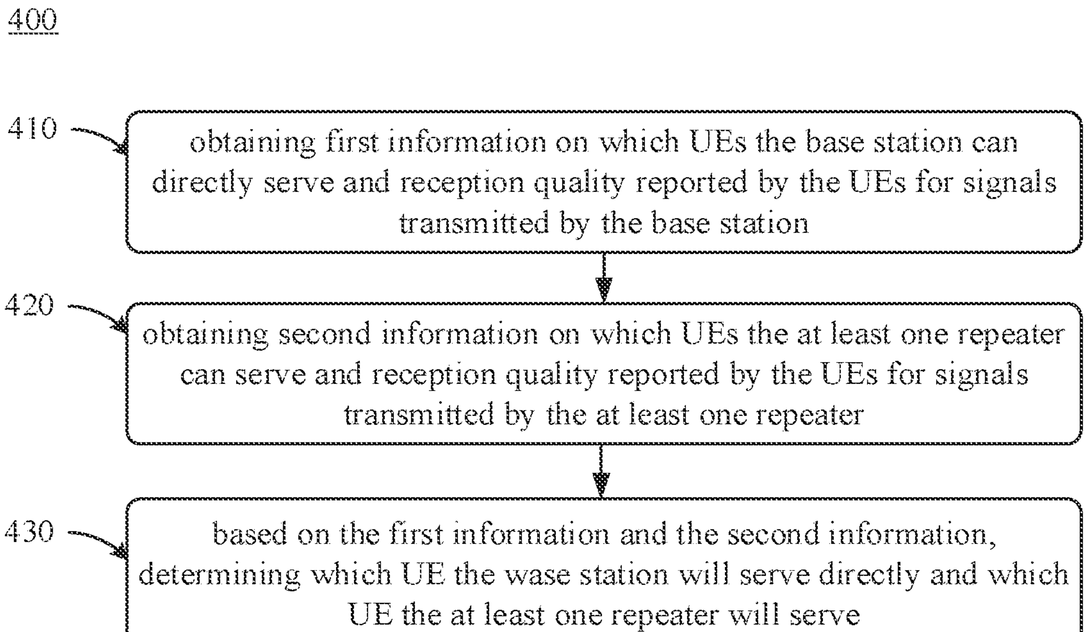
FIG. 10 is a flowchart of a control method by a second device according to some embodiments of the present application.

FIG. 10 is a flowchart of a control method 400 by a second device according to some embodiments of the present application. The control method 400 is performed by the second device wirelessly connecting with at least one first device, which is used to amplify cellular communication signals between the second device and a plurality of third devices in a network. The first device, the second device and the at least one third device may be a repeater, a base station (e.g., gNB) and at least one user equipment (UE), respectively, but the invention is not limited thereto. The exemplary structure of the repeater may be referred to FIGS. 2 to 4. The exemplary structure of the base station may be referred to FIG. 2. The wireless communication method 400 may be implemented in the processor 24 depicted in FIG. 2. The method 400 includes the following steps.

Step 410: obtaining first information on which UEs the base station can directly serve and reception quality reported by the UEs for signals transmitted by the base station.

In this step, first information is obtained by the base station. The first information includes which UEs the base station can directly serve and reception quality reported by the UEs for signals transmitted by the base station. More specifically, the base station instructs all UEs to report the reception quality. Thus, the base station will have information on the UEs it can directly serve and the reception quality associated with those UEs.

In some embodiments, Step 410 may include requiring the at least one repeater to remove or not to forward the signals transmitted by the base station for the UEs to report the reception quality. That is, the base station may require all repeaters to remove the signals before forwarding, which will be used to report the base station reception quality. Since it is to detect which UEs the base station can serve, repeating these detection signals by the repeaters is undesired. However, it should be noted that the method 400 can be performed periodically or aperiodically in order for the base station to get the information about whether one or more UEs should join or leave the coverage of the repeaters and/or the base station.

Step 420: obtaining second information on which UEs the at least one repeater can serve and reception quality reported by the UEs for signals transmitted by the at least one repeater.

In this step, second information is obtained by the base station. The second information includes which UEs the at least one repeater can serve and reception quality reported by the UEs for signals transmitted by the at least one repeater. Thus, the base station will have information on which UEs the repeater can serve and the reception quality associated with those UEs. More specifically, the base station can perform the following steps to learn which UEs the repeater can serve.

i. The base station may first generate a data containing a repeater identifier (RID) assigned to each of the repeaters. The base station may further allocate one or more resource blocks (which can be said one or more Repeater ID Resource Blocks (RIRBs)) for each repeater to transmit a signal containing the RID.

ii. The base station requires the repeater to transmit the signal containing the RID on the resource block. For example, the repeater may send its corresponding RID out on the RIRB.

iii. The base station instructs each UE to reply whether the transmitted RIRB can be received and corresponding reception quality of the forwarded RIRB if received.

Alternatively, the base station can perform the following steps to learn which UEs the repeater can serve. In this process, the base station may have to empty the RIRB, or the repeater may clean up the RIRB.

i. The base station may use information such as repeater IDs to generate different pseudo-noise (PN) sequences for the repeaters. These PN sequences can be used to identify the repeaters. The base station may configure each repeater with one of the PN sequences in advance, or the base station may be aware of which PN sequence is selected or used by a repeater.

ii. The base station requires each repeater to transmit a signal modulated with the PN sequence. For example, this may be achieved by a mechanism that is adopted by base stations to broadcast on synchronization signal blocks (SSBs). Different repeaters may transmit the signals on a same resource block.

iii. The base station instructs each UE to reply whether the transmitted signal by each repeater can be received and corresponding reception quality of the transmitted signal if received.

In this way, the base station will have information on which UEs the repeater can serve and the reception quality associated with those UEs. In addition, if there are multiple repeaters, the repeaters can transmit their RIDs on different resource blocks (e.g., RIRBs) sequentially or on the same resource block(s) (e.g., RIRB (s)) at once.

Step 430: based on the first information and the second information, determining which UE the wase station will serve directly and which UE the at least one repeater will serve.

In this step, according to the information obtained above, that is, the first information obtained in Step 410 and the second information obtained in Step 420, the base station can determine which UEs it will serve directly and which UEs the repeater will serve. The determination may be primarily based on the received DL quality reported by each UE. The reception quality may include, but is not limited to, received signal strength (RSS) and signal-to-noise ratio (SNR).

In some embodiments, the base station may be determined to serve the UE if the reception quality reported by the UE for the signals transmitted by the base station is higher than a threshold, determining. If the reception quality reported by the UE for the signals transmitted by the base station is lower than the threshold, one of the repeaters, whose reception quality is reported by the UE, may be assigned to serve the UE.

In some embodiments, if the reception quality reported by the UE for the signals transmitted by the base station is lower than the threshold, one of the repeaters, whose reception quality reported by the UE is qualified (for example, good enough or the best), may be assigned to serve the UE. That is, when the reception quality reported by the UE is lower than the threshold, the repeater, whose RIRB was reported by the UE, is assigned to serve the UE. If multiple RIRBs were reported by the UE, the repeater with the qualified RIRB quality (for example, the RIRB quality is good enough or the best) will be assigned first.

In addition, the base station may adjust the threshold and the assignment strategy of repeaters according to the load of itself and the repeaters.

In addition, during operation, one or more UEs may join or leave the coverage of the repeaters and/or the base station due to its mobility. Therefore, the above control decision process (i.e., Steps 410 to 430) can be performed periodically or aperiodically to update the network topology.

The present application provides the control method as described above. In this control method, the base station obtains first information on which third devices the second device can directly serve and reception quality reported by the third devices for signals transmitted by the second device and second information on which third devices the at least one first device can serve and reception quality reported by the third devices for signals transmitted by the at least one first device, and based on the first information and the second information, the base station determines which third device the second device will serve directly and which third device the at least one first device will serve. With this method, multipath or multi-user interference introduced by the repeater to the mobile network can be minimized. In addition, the control method may facilitate the afore-described selective repeating control and repeater gain setting.

Forwarding Time Control

In some embodiments, the base station may instruct the repeater to forward a signal or selectively forward a signal received by the repeater on a dedicated resource allocated by the network. In other embodiments, the base station may instruct the repeater to forward a signal or directly forward a selective repeating signal after introducing a group delay. Please refer to the followings for further details.

Figure 11:
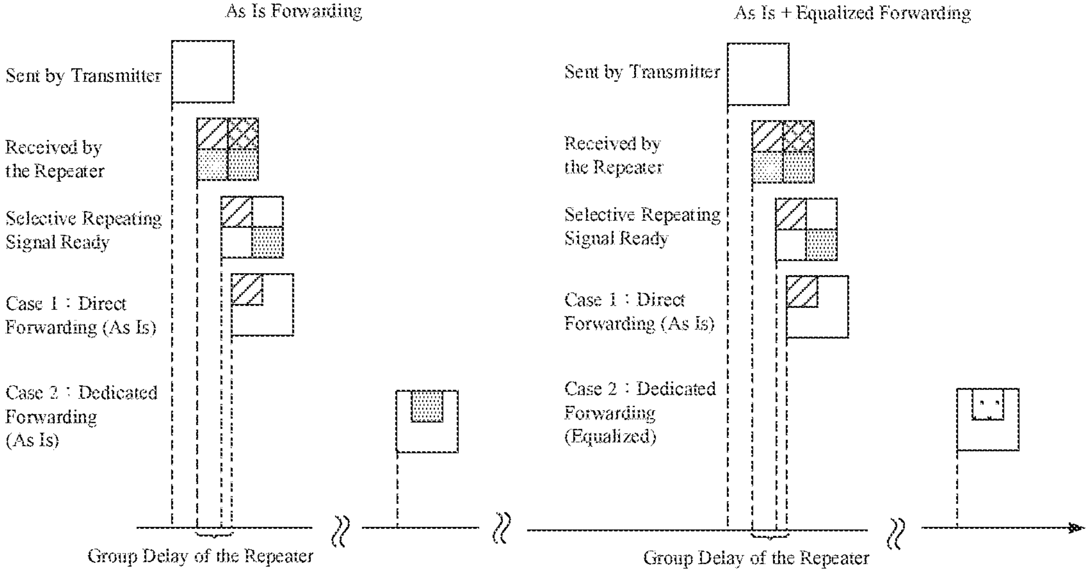
FIG. 11 is a schematic diagram illustrating an example of forwarding time control according to some embodiments of the present application.

FIG. 11 is a schematic diagram illustrating an example of forwarding time control according to some embodiments of the present application. Forwarding time control is to instruct the repeater when to forward the signal or the selective signal for DL and UL. It can be a dedicated resource allocated by the network at a subsequent time point (e.g., a later frame), or it can be directly forwarded by the repeater after introducing a group delay. As shown in FIG. 11, two cases of forwarding time control are described, where one is direct forwarding and the other is dedicated forwarding. In both cases, the repeating signal or the selective repeating signal may be "as is" as received or an equalized version of the received signal. Basically, it depends on the capabilities of the repeater. If the repeater has high processing power, i.e., the required group delay is low, the repeating signal or the selective repeating signal can be equalized and then forwarded directly.

The following Table 1 lists the pros and cons of both forwarding time controls.

TABLE 1

Comparisons of Forwarding Time Controls

| | Direct Forwarding | Dedicated Forwarding |
|---|---|---|
| Pros | ✓ No additional resource required for forwarding ✓ No control information required for forwarding time | ✓ Lower capability required for equalized signal forwarding ✓ Less time advance required for the device, which means larger coverage |
| Cons | ✓ Higher capability required for equalized signal forwarding ✓ More time advance required for the device to compensate for the group delay of the repeater, which means smaller coverage | ✓ Additional resource required for forwarding ✓ Additional control information required for forwarding time, which SHALL be robust and timely |

Control Channel

In some embodiments, the base station may instruct the repeater to receive control information on a control channel, for determining which UE the base station will serve directly and which UE the repeater will serve. Please refer to the followings for further details.

Control channel is mainly used to carry the control information from the base station to the target repeater for control decisions and forwarding time control. The repeater SHALL be able to listen to the control channel, obtain the control information, and perform its selective repeating. The control channel can be out-of-band or in-band. Out-of-band means that the control channel frequency and data forwarding frequency are different, while In-band means they are the same. Additionally, the control channel can be shared by multiple repeaters, where the control information for a repeater is tagged with its unique repeater ID. Alternatively, the control channel can be a dedicated resource for conveying the control information to a particular repeater.

It should be noted that the selective forwarding scheme and/or repeater gain setting described in the above context may be incorporated into the control method. Conversely, the control method may be incorporated into the aforementioned selective forwarding scheme and/or repeater gain setting. The control decision as reflected by the control method may be performed before operations of the selective forwarding scheme and/or repeater gain setting. It can be expected that these three methods can be combined at will without significant contradiction.

The embodiment of the present application further provides a repeater, used to amplify cellular communication signals between a base station and a user equipment. The repeater includes a Rx circuit; a Tx circuit; and a controller, coupled to the Rx circuit and the Tx circuit, the controller being configured to execute corresponding processes implemented in each of the methods of the embodiments of the present application. For brevity, details will not be described herein again.

The embodiment of the present application further provides a base station, which communicates a repeater and a user equipment with cellular signals. The base station includes a processor and a transceiver coupled to the processor, the processor being configured to execute corresponding processes implemented in each of the methods of the embodiments of the present application. For brevity, details will not be described herein again.

The embodiment of the present application further provides a user equipment, which communicates a repeater and a base station with cellular signals. The user equipment includes a processor and a transceiver coupled to the processor, the processor being configured to execute corresponding processes implemented in each of the methods of the embodiments of the present application. For brevity, details will not be described herein again.

The embodiment of the present application further provides a computer readable storage medium for storing a computer program. The computer readable storage medium enables a computer to execute corresponding processes implemented in each of the methods of the embodiments of the present application. For brevity, details will not be described herein again.

The embodiment of the present application further provides a computer program product including computer program instructions. The computer program product enables a computer to execute corresponding processes implemented in each of the methods of the embodiments of the present application. For brevity, details will not be described herein again.

The embodiment of the present application further provides a computer program. The computer program enables a computer to execute corresponding processes implemented in each of the methods of the embodiments of the present application. For brevity, details will not be described herein again.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

It should be understood that any embodiments disclosed herein as being "non-transitory" do not exclude any physical storage medium, but rather exclude only the interpretation that the medium can be construed as a transitory propagating signal.

The elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Above all, while the preferred embodiments of the present application have been illustrated and described in detail, various modifications and alterations can be made by persons of ordinary skill in the art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. A signal forwarding method, applied to a first device operating as a repeater, in which the first device is used to amplify cellular communication signals between a second device and a plurality of third devices in a network, the method comprising:

determining, by the first device, according to a control of the network, which part of received signals are to be forwarded, wherein the received signals are the cellular communication signals; and utilizing, by the first device, a gain of the first device to amplify the determined signals and forwarding the amplified signals, wherein the determining step comprises:

obtaining required information of repeating signal selectivity transmitted from the network; and determining which part of the received signals are to be forwarded, based on the obtained required information, wherein the obtaining step comprises:

obtaining a frame number that carries selectivity information and a frame number that will be applied selectivity control, wherein the selectivity information comprises symbol duration, symbol number and associated symbol selectivity controls.

2. The method according to claim 1, wherein in the determining step, the signals corresponding to the third device that is directly served by the first device are determined to be forwarded, and the signals corresponding to the third device that is not directly served by the first device are removed.

3. The method according to claim 1, wherein the received signals are forwarded in at least one of a partial frequency domain, a partial time domain and a partial spatial domain.

4. The method according to claim 1, wherein the utilizing step comprises:

utilizing a resource block repeater gain (RBRG) to amplify resource blocks allocated to the third device served by the first device.

5. The method according to claim 4, further comprising:

utilizing a designated RBRG received from the second device to amplify the resource blocks.

6. The method according to claim 5, further comprising:

reporting a capability of the first device to the second device for the second device to determine the designated RBRG, wherein the capability of the first device comprises at least one of a maximum Total Power Repeater Gain (TPRG), a maximum RBRG and a maximum total transmit power.

7. The method according to claim 4, wherein the first device is operated at different RBRGs for the resource blocks.

8. The method according to claim 7, wherein the weaker the signals of the third device, the greater the RBRG is.

9. A non-transitory machine-readable medium, comprising a plurality of instructions, when executed by a machine, the instructions cause the machine to perform the signal forwarding method according to claim 1.

10. A first device, operating as a repeater and used to amplify cellular communication signals between a second device and a plurality of third devices in a network, the first device comprising:

a Rx circuit;

a Tx circuit; and a controller, coupled to the Rx circuit and the Tx circuit, the controller of the first device being configured to:

determine, according to a control of the network, which part of received signals, are to be forwarded, wherein the received signals are the cellular communication signals; and utilize a gain of the first device to amplify the determined signals and forwarding the amplified signals, wherein the controller is further configured to:

obtain required information of repeating signal selectivity transmitted from the network; and determine which part of the received signals are to be forwarded, based on the obtained required information, wherein the controller is further configured to:

obtain a frame number that carries selectivity information and a frame number that will be applied selectivity control, wherein the selectivity information comprises symbol duration, symbol number and associated symbol selectivity controls.

11. The first device according to claim 10, wherein the signals corresponding to the third device that is directly served by the first device are determined to be forwarded, and the signals corresponding to the third device that is not directly served by the first device are removed.

12. The first device according to claim 10, wherein the received signals are forwarded in at least one of a partial frequency domain, a partial time domain and a partial spatial domain.

13. The first device according to claim 10, wherein the controller is further configured to:

utilize a resource block repeater gain (RBRG) to amplify resource blocks allocated to the third device served by the first device.

14. The first device according to claim 13, wherein the controller is further configured to:

utilize a designated RBRG received from the second device to amplify the resource blocks.

15. The first device according to claim 14, wherein the controller is further configured to:

report a capability of the first device to the second device for the second device to determine the designated RBRG, wherein the capability of the first device comprises at least one of a maximum Total Power Repeater Gain (TPRG), a maximum RBRG and a maximum total transmit power.

16. The first device according to claim 13, wherein the first device is operated at different RBRGs for the resource blocks.

* * * * *